Feb. 2, 1954 J. BUCCI 2,668,117
METHOD OF MAKING FROZEN PIZZA
Filed Aug. 10, 1950

INVENTOR.
JOSEPH BUCCI
BY
Morris Michael Marks
ATTORNEY.

Patented Feb. 2, 1954

2,668,117

UNITED STATES PATENT OFFICE 2,668,117

METHOD OF MAKING FROZEN PIZZA

Joseph Bucci, Philadelphia, Pa.

Application August 10, 1950, Serial No. 178,625

8 Claims. (Cl. 99—192)

My invention relates to food products, and it relates more particularly to foods such, for instance, as frozen foods which comprise, in the unfrozen state, a doughy mass or baked, or otherwise cooked product thereof, juxtaposed to a food ingredient of liquid or moist consistency. Such foods include pies, upsidedown cakes, dumplings, or the like.

In the preparation of foods of this category, when the food is to be served immediately after the preparation thereof, the baked or otherwise cooked doughy mass retains its dry and crisp or resilient (as the case may be) state, even while being served in actual contact with a liquid or a moist food ingredient such as a sauce, gravy, soup or the like. This is so because there has not been sufficient time for the liquid to penetrate the crust of the doughy mass or otherwise to change its structure. However, when there has been a lapse of several hours or longer, the liquid or moisture contained in the sauce, gravy or the like, acts on the doughy mass to penetrate the crust thereof and to break down its structure. Continued time lapse, causes the doughy mass to become soggy and heavy, and to lose its original characteristics; and thus to become generally unpalatable.

It has been found that even when foods of this category are quick-frozen, and then thawed out, heated and served, unwanted moisture penetrates the doughy mass and renders it soggy and unpalatable.

It has also been found that certain doughy constituents of foods, such for instance as the doughy portion of tomato pies as hitherto known, are irregular in consistency and appearance. Thus, for instance, according to present-day practice in making tomato pies, the dough is laid in a pan, and holes are punched in the dough to prevent air-bubbles from forming during the rising and baking process. As a result, the dough is irregular in consistency, frequently gummy in some spots and hard in other spots. In addition, the sauce which is poured over the dough often penetrates through the punched-out portions and burns against the pan.

One object of my invention therefore, is to provide a frozen food having a doughy constituent adjacent a constituent which is of a moist or liquid consistency when at room temperature; said frozen food being so constituted that unwanted moisture may not penetrate said doughy constituent, regardless of the temperature of the food.

Another object of my invention is to provide a baked, or otherwise cooked, food having a doughy constituent; said food being so constituted as to assure an even and substantially homogeneous texture to the doughy constituent when it is heated in the baking or otherwise cooking process.

Another object of my invention is to provide a method of making a frozen food which is to be served in an unfrozen state, whereby the various constituents of said food will be preserved in their proper consistency.

With the above and other objects in view, my invention consists of a food comprising a doughy constituent, a wet constituent, and an edible sealing agent spread on said doughy constituent and disposed between said wet constituent and said doughy constituent.

My invention also consists of a food comprising a doughy constituent, an edible sealing agent spread on said doughy constituent and comprising binding fibers penetrating said doughy constituent; said sealing agent being adapted to coagulate when heated.

My invention further consists of the various elements, relationships and methods as more fully hereinafter described.

For the purpose of illustrating my invention, I have shown in the accompanying drawings forms thereof which are at present preferred by me, since the same have been found in practice to give satisfactory and reliable results, although it is to be understood that the various instrumentalities of which my invention consists can be variously arranged and organized and that my invention is not limited to the precise arrangement and organizations of the instrumentalities as herein shown and described.

Referring now to the drawings, in which like reference characters indicate like parts:

For purposes of illustration only, I have shown in the accompanying drawings a food product which is known generally as a "tomato pie" or "pizza"; although it is to be understood that my invention applies as well to ordinary pies, cakes, puddings, dumplings, and other similar foods which have constituents of doughy and wet products juxtaposed one to another. It should also be understood that wherever the word "cook" or other derivative thereof appears hereinafter, it shall be interpreted as including the meaning of the word "bake" or any derivative thereof.

According to my invention, I provide dough which, in the case of a tomato pie, may be made of the following ingredients:

80 pounds of flour
18 quarts of water
1 pound of yeast, and
25 ounces of salt.

Figure 1:
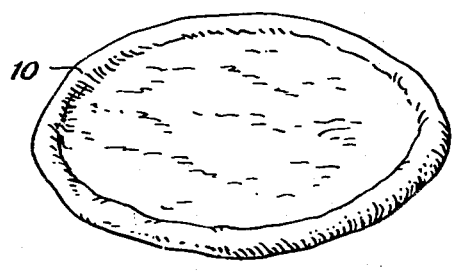
Figure 1 represents a perspective view of a shell comprising a doughy constituent of a food product embodying my invention.
Figure 2:
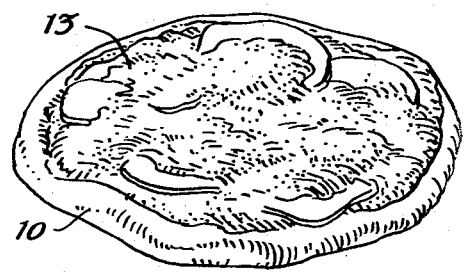
Figure 2 represents a similar perspective view of a complete food product, comprising the doughy shell and a sauce filling which is normally wet in the unfrozen state, and embodying my invention.
Figure 3:
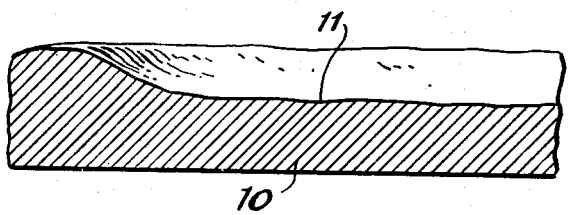
Figure 3 represents an enlarged vertical sectional view of a portion of the doughy shell of a food embodying my invention, said shell being shown in its initial, unraised and unbaked state.
Figure 5:
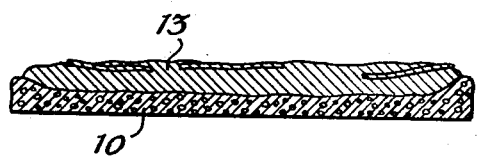
Figure 5 represents a vertical sectional view of a completed food product embodying my invention.
Figure 4:
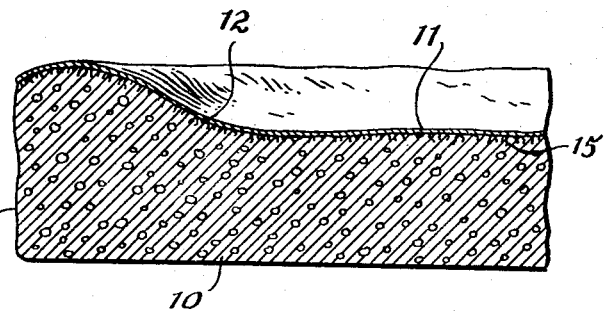
Figure 4 represents a similar vertical sectional view of the shell, in its raised and partially baked state, and as prepared for a frozen food embodying my invention.

These may be kneaded together and then divided into 200 equal parts, which are preferably spread on pie tins, substantially in the shape illustrated in Figure 1; thus forming for each tin, the pie shell 10.

An edible sealing agent 11 is then spread on the top of each shell 10, and the shells are placed for 9 minutes in a suitable oven (not shown), which is preferably maintained at 450° temperature. During this process, the yeast rises, the sealing agent penetrates the top portion of the risen dough, and then itself coagulates so as to form a moisture-impervious layer of minuscule thickness, anchored in the top portion of the shell 10, preferably by myriad fibers 15 of the sealing agent. In this process, the sealing agent 11 coalesces and tightens into a binding agent which prevents so-called "air-bubbles" from forming within the shell. The top layer of the shell being bound by the sealing agent 11 against distortion, the expanding gases permeate the rising, doughy mass of the shell and are dispersed therein. In this manner, an even, homogeneous texture is provided the interior of the shell 10.

I have found in practice, that in the case of tomato pies, an excellent sealing agent for this purpose, is tomato puree. Other sealing agents which I have found satisfactory are cooked tomatoes, a mixture of water and tomato paste, and tomato juice. However, my invention is not limited to the use of a tomato product as a sealing agent. Other edible coagulating substances may be used as required, for the individual food product being prepared. Thus, for instance, egg albumen, a mixture of sugar and water, fruit sauces or jams, or the like, may be used as the specific sealing agent, or an ingredient thereof, in the making of a food product embodying my invention. As an illustration of such use, when it is desired to make a peach pie, the crust (not shown) may be spread on a pie pan and a layer of peach nectar (not shown) may be thinly spread thereon. The pie crust is then partially baked in an oven until the water contained in the peach nectar is driven off, and the remaining substance of the nectar has coagulated. Such pie shell (not shown) is removed from the oven and is then ready for the next stage of the preparation of the pie, as for instance the pouring in of the pie filling. It will thus be seen that in similar manner other sealing agents may be provided and used in the method or structure embodied in my invention, without departing from the spirit or essential attributes thereof.

Returning now to that illustration of my invention, wherein a tomato pie is made, the shells are removed from the oven, and a suitable sauce is placed in the concave portion 12 of each shell, above the coagulated sealing agent 11 thereof. A suitable sauce 13 for such pies may be made in the following manner:

115 pounds of canned tomatoes
21 ounces of salt
1½ ounces oregano
1½ ounces black pepper
¾ teaspoon red ground pepper
3 ounces raw onion
¾ ounce rosemary
9 ounces garlic
3 tablespoons sugar
4½ quarts cooking oil These ingredients are placed in a suitable container on a stove, and are boiled for one hour. The sauce is then allowed to cool, whereupon it is poured over the coagulated sealing agent in the concave portion 12 of each shell 10. If desired, additional food elements, such as cheese strips, anchovies or the like, may be added. When it is desired to quick-freeze the pie, it is placed in a cooling room and maintained overnight at a temperature of 50°. It is then quick-frozen in a suitable chamber at 10° below zero. Either before or if desired, following its quick-freezing, it may be packaged in any suitable manner for preservation, for merchandising, transportation, handling or the like.

An alternative method of applying the sauce, may be used. The completed shell 10 itself may be quick-frozen, in which state the heat-coagulated sealing agent 11 may take on the appearance and "feel" of glass. The sauce may then be poured over the sealing agent in the concave portion 12 of the shell 10, and the entire pie may then be cooled and quick-frozen.

When it is desired to use the frozen food embodying my invention, it is merely necessary to heat it to the proper temperature for eating. It will be found that the coagulated sealing agent prevents access of the moisture in the sauce from passing to the dough, and thereby preserves the dough and prevents the same from becoming soggy. Not only so, but in many sealing agents such as the tomato products described herein, or the like, fibrous elements embodied in the sealing agent are drawn into the dough, as by capillary attraction, and serve to bind the upper layer of the dough and effectively to secure the sealing agent in airtight and water-tight relation thereto. Thus, when the pie is being heated, the outside portion 14 of the shell 10, which portion is not coated with the sealing agent 11 becomes crisp and "done." The upper doughy portion of the shell 10, however does not become crisp or hard, but remains soft and resilient.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention what I claim as new and desire to secure by Letters Patent is:

1. The method of making a frozen pizza, comprising preparing a dough, disposing said dough in preliminary condition for cooking; providing an edible sealing agent selected from the group consisting of tomato puree, cooked tomatoes, diluted tomato paste, and tomato juice; spreading said sealing agent on a surface of said dough; pre-cooking said dough and sealing agent; quick-freezing said dough and sealing agent; disposing a wet food constituent on said sealing agent; and quick freezing said dough, sealing agent and wet constituent combination.

2. The method of making a frozen pizza, comprising preparing a dough; disposing said dough in preliminary condition for cooking; providing an edible sealing agent selected from the group consisting of tomato puree, cooked tomatoes, diluted tomato paste, and tomato juice; said sealing agent comprising fibrous elements and having a coagulating characteristic; spreading said sealing agent on a surface of said dough; pre-cooking said dough and sealing agent until said fibrous elements penetrate said dough and said sealing agent coagulates; quick freezing said dough and sealing agent; disposing a wet food constituent on said sealing agent; and quick-freezing said dough, sealing agent and wet constituent combination.

3. The method of making a frozen pizza, comprising preparing a dough; disposing said dough in preliminary condition for cooking; providing an edible sealing agent selected from the group consisting of tomato puree, cooked tomatoes, diluted tomato paste, and tomato juice; said sealing agent comprising fibrous elements and having a coagulating characteristic; spreading said sealing agent on a surface of said dough; pre-cooking said dough and sealing agent until said fibrous elements penetrate said dough and said sealing agent coagulates; disposing a wet food constituent on said sealing agent; and quick-freezing said dough, sealing agent and wet constituent combination.

4. The method of making a frozen pizza, comprising preparing a dough; disposing said dough in preliminary condition for cooking; providing a liquid sealing agent selected from the group consisting of tomato puree, cooked tomatoes, diluted tomato paste, and tomato juice; spreading said sealing agent on a surface of said dough; pre-cooking said dough and sealing agent; disposing a wet food constituent on said pre-cooked sealing agent; and quick-freezing said dough, sealing agent and wet constituent combination.

5. The method of making a frozen pizza, comprising preparing a dough; disposing said dough in preliminary condition for cooking; providing an edible sealing agent selected from the group consisting of tomato puree, cooked tomatoes, dilute tomato paste, and tomato juice; said sealing agent comprising fibrous elements; spreading said sealing agent on a surface of said dough; pre-cooking said dough and sealing agent until said fibrous elements penetrate said dough; disposing a wet food constituent on said sealing agent; and quick-freezing said dough, sealing agent and wet constituent combination.

6. The method of making a frozen pizza, comprising preparing a dough; disposing said dough in preliminary condition for cooking; providing an edible sealing agent selected from the group consisting of tomato puree, cooked tomatoes, dilute tomato paste, and tomato juice; said sealing agent having a coagulating characteristic; spreading said sealing agent on a surface of said dough; coagulating said sealing agent on said dough; disposing a wet food constituent on said coagulated sealing agent; and quick-freezing said dough, sealing agent and wet constituent combination.

7. The method of making a frozen pizza, comprising preparing a dough, disposing said dough in preliminary condition for cooking; providing an edible sealing agent selected from the group consisting of tomato puree, cooked tomatoes, dilute tomato paste, and tomato juice, said sealing agent comprising fibrous elements; spreading said sealing agent on a surface of said dough; causing said fibrous elements to penetrate said dough while said sealing agent coalesces along said surface; disposing a wet food constituent on said coalesced sealing agent; and quick-freezing said dough, sealing agent and wet constituent combination.

8. The method of making a frozen pizza, comprising preparing a dough; disposing said dough in preliminary condition for cooking; providing a liquid sealing agent selected from the group consisting of tomato puree, cooked tomatoes, dilute tomato paste, and tomato juice; spreading said sealing agent on a surface of said dough; coalescing said sealing agent on said surface; disposing a wet food constituent on said coalesced sealing agent; and quick-freezing said dough, sealing agent and wet constituent combination.

JOSEPH BUCCI.

References Cited in the file of this patent

UNITED STATES PATENTS

| Number | Name | Date |
|---|---|---|
| 2,248,289 | Thal | July 8, 1941 |
| 2,547,206 | Hanau | Apr. 3, 1951 |

OTHER REFERENCES

Gillette, The White House Cook Book, The Saalfield Pub. Co., 1929, page 364.

Boni, The Talesman, Italian Cook Book, Crown Pub., N. Y., 1950.

Frosted Food Field and Food, Oct. 1949, page 13.

Givens, Modern Encyclopedia of Cooking, vol. I (1949), page 668.